(12) United States Patent
Liu

(10) Patent No.: US 12,162,526 B2
(45) Date of Patent: Dec. 10, 2024

(54) TRAIN OPERATION CONTROL METHOD AND APPARATUS, AND NON-TRANSITORY COMPUTER-READABLE STORAGE MEDIUM

(71) Applicant: BYD COMPANY LIMITED, Shenzhen (CN)

(72) Inventor: Weizhao Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 416 days.

(21) Appl. No.: 17/628,893

(22) PCT Filed: Jul. 31, 2020

(86) PCT No.: PCT/CN2020/106123
§ 371 (c)(1),
(2) Date: Jan. 20, 2022

(87) PCT Pub. No.: WO2021/018278
PCT Pub. Date: Feb. 4, 2021

(65) Prior Publication Data
US 2022/0250668 A1    Aug. 11, 2022

(30) Foreign Application Priority Data

Jul. 31, 2019 (CN) .......................... 201910703435.5

(51) Int. Cl.
*B61L 27/57* (2022.01)
*B60L 58/10* (2019.01)
(Continued)

(52) U.S. Cl.
CPC ............... *B61L 27/57* (2022.01); *B60L 58/10* (2019.02); *B61C 17/06* (2013.01); *B61L 27/16* (2022.01); *B60L 2200/26* (2013.01)

(58) Field of Classification Search
CPC .......... B61L 27/57; B61L 27/16; B60L 58/10; B60L 2200/26; B61C 17/06
(Continued)

(56) References Cited

U.S. PATENT DOCUMENTS 8,234,027 B2 * 7/2012 Yamada ................ B60W 10/26
701/22
11,820,410 B2 * 11/2023 Liu ......................... B61L 27/16
(Continued)

FOREIGN PATENT DOCUMENTS

CN    103738367 A    4/2014
CN    103764478 A    4/2014
(Continued)

OTHER PUBLICATIONS

The World Intellectual Property Organization (WIPO) International Search Report for PCT/CN2020/106123 Nov. 5, 2021 6 pages (with translation).

*Primary Examiner* — Manglesh M Patel
(74) *Attorney, Agent, or Firm* — Wenye Tan

(57) ABSTRACT

A train operation control method includes acquiring a battery state of an arriving train, and determining a target dwell time of the arriving train according to the battery state of the arriving train, actual operation data of the arriving train, and planned operation data of the arriving train, so that the arriving train stops for charging according to the target dwell time. The actual operation data of the arriving train includes an actual arrival time of the arriving train, and the planned operation data of the arriving train includes a planned arrival time, a planned dwell time, a minimum dwell time, and a maximum dwell time of the arriving train.

12 Claims, 4 Drawing Sheets

(51) Int. Cl.
*B61C 17/06* (2006.01)
*B61L 27/16* (2022.01)

(58) Field of Classification Search
USPC .......................................... 701/29.4
See application file for complete search history.

(56) References Cited

U.S. PATENT DOCUMENTS

| | | | | |
|---|---|---|---|---|
| 2008/0243331 | A1* | 10/2008 | Kato | B60L 50/61 |
| | | | | 701/29.5 |
| 2011/0202221 | A1* | 8/2011 | Sobue | B60K 16/00 |
| | | | | 701/22 |
| 2011/0227532 | A1* | 9/2011 | Niwa | G01C 21/3469 |
| | | | | 320/109 |
| 2012/0065837 | A1* | 3/2012 | Noack | B60L 53/66 |
| | | | | 180/65.21 |
| 2012/0109515 | A1* | 5/2012 | Uyeki | G01C 21/3469 |
| | | | | 701/423 |
| 2012/0112696 | A1* | 5/2012 | Ikeda | H01M 10/48 |
| | | | | 320/109 |
| 2013/0006677 | A1* | 1/2013 | Anglin | G05B 15/02 |
| | | | | 320/109 |
| 2013/0226441 | A1* | 8/2013 | Horita | G01C 21/3469 |
| | | | | 701/117 |
| 2014/0368154 | A1 | 12/2014 | Hanashima et al. | |
| 2015/0006002 | A1* | 1/2015 | Yamane | G01C 21/3469 |
| | | | | 701/22 |
| 2016/0107534 | A1* | 4/2016 | Ikeda | H01M 10/44 |
| | | | | 307/9.1 |
| 2017/0043671 | A1* | 2/2017 | Campbell | G08G 1/0129 |
| 2019/0092182 | A1* | 3/2019 | Gersch | H02J 7/0071 |
| 2019/0107406 | A1* | 4/2019 | Cox | G01S 19/42 |
| 2019/0118655 | A1* | 4/2019 | Grimes | B60L 58/10 |
| 2019/0126766 | A1* | 5/2019 | Taguchi | G06Q 50/40 |
| 2019/0160958 | A1* | 5/2019 | Chaudhary | B60L 53/665 |
| 2019/0178678 | A1* | 6/2019 | Rahbari Asr | B60L 53/66 |
| 2019/0324600 | A1* | 10/2019 | Wipperfürth | H04W 4/48 |
| 2020/0104890 | A1* | 4/2020 | Tanaka | G06Q 30/0284 |
| 2020/0164763 | A1* | 5/2020 | Holme | B60L 58/16 |
| 2020/0202715 | A1* | 6/2020 | Mota | G06Q 30/0283 |
| 2021/0086647 | A1* | 3/2021 | Kiessling | B60L 53/67 |
| 2021/0086651 | A1* | 3/2021 | Maeda | B60L 53/66 |
| 2022/0048399 | A1* | 2/2022 | Nishita | H02J 3/003 |
| 2022/0169138 | A1* | 6/2022 | Brombach | B60L 53/65 |
| 2022/0188710 | A1* | 6/2022 | Nagata | G06Q 10/02 |
| 2022/0247001 | A1* | 8/2022 | Konishi | B60L 58/12 |
| 2023/0001824 | A1* | 1/2023 | Shaotran | H01M 10/486 |
| 2023/0001825 | A1* | 1/2023 | Yokoyama | B60L 50/60 |
| 2023/0249584 | A1* | 8/2023 | Ogaki | B60L 58/26 |
| | | | | 701/22 |
| 2023/0347779 | A1* | 11/2023 | Follen | B60L 53/64 |
| 2023/0382258 | A1* | 11/2023 | Pressman | B60L 53/62 |
| 2023/0398895 | A1* | 12/2023 | Lu | B60L 53/305 |
| 2023/0406130 | A1* | 12/2023 | Budiscak | B60L 53/66 |
| 2024/0001793 | A1* | 1/2024 | Isaksson | B60L 53/68 |
| 2024/0198844 | A1* | 6/2024 | Matsumoto | B60L 53/62 |

FOREIGN PATENT DOCUMENTS

| | | |
|---|---|---|
| CN | 103963805 A | 8/2014 |
| CN | 104192177 A | 12/2014 |
| CN | 105835914 A | 8/2016 |
| CN | 106494468 A | 3/2017 |
| CN | 106541967 A | 3/2017 |
| CN | 106605346 A | 4/2017 |
| CN | 106828547 A | 6/2017 |
| CN | 108622143 A | 10/2018 |
| CN | 109733440 A | 5/2019 |
| CN | 109760721 A | 5/2019 |
| CN | 109795356 A | 5/2019 |
| JP | 07304353 A | 11/1995 |

* cited by examiner

TRAIN OPERATION CONTROL METHOD AND APPARATUS, AND NON-TRANSITORY COMPUTER-READABLE STORAGE MEDIUM

CROSS-REFERENCE TO RELATED APPLICATIONS

This application is a national stage entry under 35 U.S.C. § 371 of International Application No. PCT/CN2020/106123, filed on Jul. 31, 2020, which claims priority to Chinese Patent Application No. 201910703435.5, entitled "TRAIN OPERATION CONTROL METHOD AND APPARATUS, AND NON-TRANSITORY COMPUTER-READABLE STORAGE MEDIUM" filed on Jul. 31, 2019, the contents of all of which are incorporated by reference in its entirety.

FIELD

The present disclosure relates to the technical field of rail transit, and in particular, to a train operation control method and apparatus and a non-transitory computer-readable storage medium.

BACKGROUND

With the development of the rail transit fully automatic operation signal system and the power battery new energy business, new energy power batteries start to be applied to trains, reducing the costs required for paving conductive rails to provide power for the trains. In addition, charging piles are mounted at the station platform, so that when the train stops at the station platform for passengers to get on and off, the train is charged by the charging piles by utilizing the short stopping time of the train at the station platform.

An existing train operation control method is mainly to perform adjustment according to the deviation of the actual operation situation and the planned operation situation of the train, so that the actual operation status of the train tends to be consistent with the operation plan.

SUMMARY

The disclosure aims to solve at least one of the technical problems existing in the related art.

To this end, a first objective of the present disclosure is to provide a train operation control method.

A second objective of the present disclosure is to provide a train operation control apparatus.

A third objective of the present disclosure is to propose another train operation control apparatus.

A fourth objective of the present disclosure is to provide a non-transitory computer-readable storage medium.

In order to achieve the above objectives, according to a first aspect of embodiments of the present disclosure, a train operation control method is provided. The method includes: acquiring a battery state of an arriving train; and determining a target dwell time of the arriving train according to the battery state of the arriving train, actual operation data of the arriving train, and planned operation data of the arriving train, so that the arriving train stops for charging according to the target dwell time, where the actual operation data of the arriving train includes an actual arrival time of the arriving train, and the planned operation data of the arriving train includes a planned arrival time, a planned dwell time, a minimum dwell time, and a maximum dwell time of the arriving train.

Optionally, the acquiring a battery state of an arriving train includes: acquiring a state of charge of a power battery of the arriving train; and determining the battery state of the arriving train according to the state of charge of the power battery of the arriving train, where the battery state of the arriving train includes a normal state and a power shortage state.

Optionally, the determining a target dwell time of the arriving train according to the battery state of the arriving train, actual operation data of the arriving train, and planned operation data of the arriving train includes: determining the planned dwell time as the target dwell time if a time difference between the actual arrival time and the planned arrival time is beyond a first preset time difference range, the actual arrival time of the arriving train is later than the planned arrival time, and the battery state of the arriving train is the power shortage state; and determining the maximum dwell time or a sum of the planned dwell time and a preset time as the target dwell time if the time difference between the actual arrival time and the planned arrival time is within the first preset time difference range, and the battery state of the arriving train is the power shortage state, where the sum of the planned dwell time and the preset time is less than the maximum dwell time.

Optionally, the determining a target dwell time of the arriving train according to the battery state of the arriving train, actual operation data of the arriving train, and planned operation data of the arriving train includes: determining, in a case that a sum of an absolute value of the time difference and the planned dwell time is greater than or equal to the maximum dwell time, the maximum dwell time as the target dwell time, and determining, in a case that the sum of the absolute value of the time difference and the planned dwell time is less than the maximum dwell time, the sum of the absolute value of the time difference and the planned dwell time as the target dwell time, if the time difference between the actual arrival time and the planned arrival time is beyond the first preset time difference range, and the actual arrival time of the arriving train is earlier than the planned arrival time; determining, in a case that a difference between the planned dwell time and the absolute value of the time difference is greater than or equal to the minimum dwell time, the difference between the planned dwell time and the absolute value of the time difference as the target dwell time, and determining, in a case that the difference between the planned dwell time and the absolute value of the time difference is less than the minimum dwell time, the minimum dwell time as the target dwell time, if the time difference between the actual arrival time and the planned arrival time is beyond the first preset time difference range, the actual arrival time of the arriving train is later than the planned arrival time, and the battery state of the arriving train is the normal state; and determining the planned dwell time as the target dwell time if the time difference between the actual arrival time and the planned arrival time is within the first preset time difference range, and the battery state of the arriving train is the normal state.

Optionally, the method further includes: acquiring a battery state of a departing train; and determining a target section operation time of the departing train according to the battery state of the departing train, actual operation data of the departing train, and planned operation data of the departing train, so that the departing train runs to a next station according to the target section operation time, where the actual operation data of the departing train includes an actual departure time of the departing train, and the planned operation data of the departing train includes a planned departure time, a planned section operation time, a minimum section operation time, and a maximum section operation time of the departing train.

Optionally, the acquiring a battery state of a departing train includes: acquiring a state of charge of a power battery of the departing train; and determining the battery state of the departing train according to the state of charge of the power battery of the departing train, where the battery state of the departing train includes a normal state and a power shortage state.

Optionally, the determining a target section operation time of the departing train according to the battery state of the departing train, actual operation data of the departing train, and planned operation data of the departing train includes: determining the planned section operation time as the target section operation time if a time difference between the actual departure time and the planned departure time is beyond a second preset time difference range, the actual departure time of the departing train is earlier than the planned departure time, and the battery state of the departing train is the power shortage state; and determining the minimum section operation time as the target section operation time if the time difference between the actual departure time and the planned departure time is within the second preset time difference range, and the battery state of the departing train is the power shortage state.

Optionally, the determining a target section operation time of the departing train according to the battery state of the departing train, actual operation data of the departing train, and planned operation data of the departing train includes: determining, in a case that a sum of an absolute value of the time difference and the planned section operation time is greater than or equal to the maximum section operation time, the maximum section operation time as the target section operation time, and determining, in a case that a sum of the absolute value of the time difference and the planned section operation time is less than the maximum section operation time, the sum of the absolute value of the time difference and the planned section operation time as the target section operation time, if the time difference between the actual departure time and the planned departure time is beyond the second preset time difference range, the actual departure time of the departing train is earlier than the planned departure time, and the battery state of the departing train is the normal state; determining, in a case that a difference between the planned section operation time and the absolute value of the time difference is greater than or equal to the minimum section operation time, the difference between the planned section operation time and the absolute value of the time difference as the target section operation time, and determining, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the normal state; determining, in a case that the difference between the planned section operation time and the absolute value of the time difference is greater than or equal to the minimum section operation time, the difference between the planned section operation time and the absolute value of the time difference or the minimum section operation time as the target section operation time, and determining, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the power shortage state; and determining the planned section operation time as the target section operation time if the time difference between the actual departure time and the planned departure time is within the second preset time difference range, and the battery state of the departing train is the normal state.

According to a second aspect of the embodiments of the present disclosure, a train operation control apparatus is provided. The apparatus includes: a first acquisition module, configured to acquire a battery state of an arriving train; and a first determination module, configured to determine a target dwell time of the arriving train according to the battery state of the arriving train, actual operation data of the arriving train, and planned operation data of the arriving train, so that the arriving train stops for charging according to the target dwell time, where the actual operation data of the arriving train includes an actual arrival time of the arriving train, and the planned operation data of the arriving train includes a planned arrival time, a planned dwell time, a minimum dwell time, and a maximum dwell time of the arriving train.

Optionally, the first determination module is configured to: determine the planned dwell time as the target dwell time if a time difference between the actual arrival time and the planned arrival time is beyond a first preset time difference range, the actual arrival time of the arriving train is later than the planned arrival time, and the battery state of the arriving train is the power shortage state; and determine the maximum dwell time or a sum of the planned dwell time and a preset time as the target dwell time if the time difference between the actual arrival time and the planned arrival time is within the first preset time difference range, and the battery state of the arriving train is the power shortage state, where the sum of the planned dwell time and the preset time is less than the maximum dwell time.

Optionally, the apparatus further includes: a second acquisition module, configured to acquire a battery state of a departing train; and a second determination module, configured to determine a target section operation time of the departing train according to the battery state of the departing train, actual operation data of the departing train, and planned operation data of the departing train, so that the departing train runs to a next station platform for charging according to the target section operation time, where the actual operation data of the departing train includes an actual departure time of the departing train, and the planned operation data of the departing train includes a planned departure time, a planned section operation time, a minimum section operation time, and a maximum section operation time of the departing train.

Optionally, the second determination module is configured to: determine the planned section operation time as the target section operation time if a time difference between the actual departure time and the planned departure time is beyond a second preset time difference range, the actual departure time of the departing train is earlier than the planned departure time, and the battery state of the departing train is the power shortage state; and determine the minimum section operation time as the target section operation time if the time difference between the actual departure time and the planned departure time is within the second preset time difference range, and the battery state of the departing train is the power shortage state.

According to a third aspect of the embodiments of the present disclosure, a train operation control apparatus is provided. The apparatus includes: a memory, storing a computer program therein; and a processor, configured to execute the computer program in the memory, to perform steps of the train operation control method provided in the first aspect of the present disclosure.

According to a fourth aspect of the embodiments of the present disclosure, a non-transitory computer-readable storage medium is provided and has a computer program stored therein. When the program is executed by a processor, steps of the train operation control method in the first aspect of the present disclosure are performed.

In the above technical solutions, during the determining of the target dwell time of the arriving train, the battery state of the arriving train itself is taken into full consideration. In this way, for the arriving train in the power shortage state and in the normal state, the target dwell time suitable for the train can be determined more specifically, thereby achieving the self-adaptive control of the charging duration of the arriving train.

Other features and advantages of the present disclosure will be described in detail in the following detailed description part.

BRIEF DESCRIPTION OF THE DRAWINGS

The foregoing and/or additional aspects and advantages of the present disclosure will become apparent and comprehensible in the description made with reference to the following accompanying drawings.

DETAILED DESCRIPTION

Figure 1:
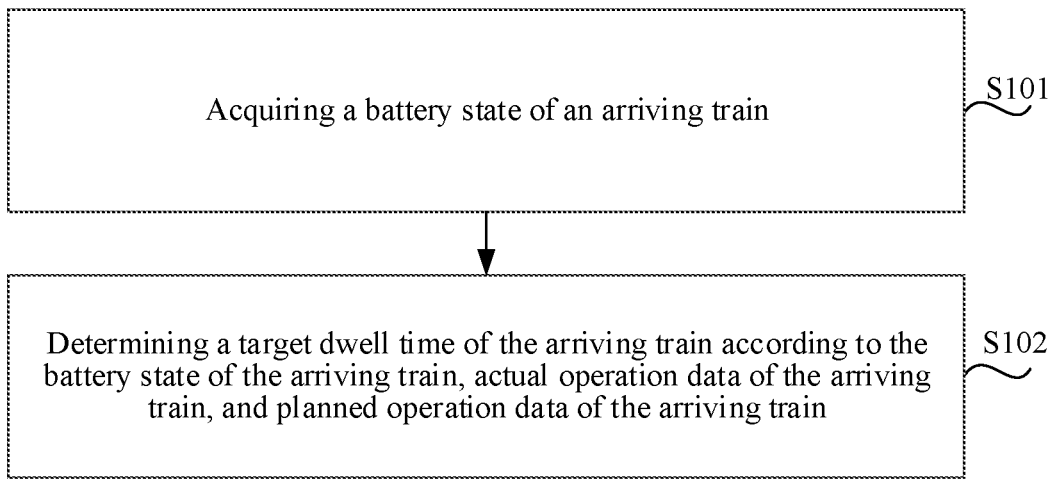
FIG. 1 is a flowchart of a train operation control method according to an exemplary embodiment of the present disclosure.

The following describes embodiments of the present disclosure in detail. Examples of the embodiments are shown in the accompanying drawings, and same or similar reference numerals in all the accompanying drawings indicate same or similar components or components having same or similar functions. The embodiments described below with reference to the accompanying drawings are exemplary, aiming to explain the present disclosure, but cannot be understood as a limitation on the present disclosure.

A train operation control method and apparatus and a non-transitory computer-readable storage medium of the embodiments of the present disclosure are described below with reference to the accompanying drawings.

FIG. 1 is a flowchart of a train operation control method according to an exemplary embodiment of the present disclosure. The train operation control method may be applicable to a train operation control system, for example, an automatic train supervision (ATS) system. Alternatively, the train operation control method may be applicable to the cloud, for example, a server for controlling the operation of a train. The solutions of the present disclosure are described by using the method applicable to the ATS system as an example.

As shown in FIG. 1, the method may include the following steps.

S101: Acquiring a battery state of an arriving train.

The battery state of the arriving train is a battery state of a train when arriving at a station platform. For example, a power battery detection module may be mounted to the train. The module is connected to a battery management system in a power battery pack of the train. The power battery detection module can acquire the battery state of power batteries of the train in real time. For example, the power battery detection module may be connected to a wired network of a vehicle-mounted controller system by the Ethernet. The wired network of the vehicle-mounted system connects to a ground safety net by using a vehicle-ground wireless network, so that the battery state of the train is reported to the ATS system in real time. In an embodiment, a state of charge of a power battery of the arriving train may be first acquired, and then the battery state of the arriving train is determined according to the state of charge of the power battery of the arriving train. The battery state of the arriving train includes a normal state and a power shortage state. Specifically, a power threshold of the arriving train may be set in the ATS system in advance. If the state of charge of the power battery is greater than or equal to the power threshold when the train arrives at a station, the battery state of the arriving train is determined as the normal state. If the state of charge of the power battery is less than the power threshold when the train arrives at the station, the battery state of the arriving train is determined as the power shortage state. For example, if the power threshold of the train accounts for 80% of total power of the train, when the state of charge of the power battery is greater than or equal to 80% of the total power of the train when the train arrives at the station, the battery state of the arriving train may be determined as the normal state. In a case that the state of charge of the power battery is less than 80% of the total power of the train when the train arrives at the station, the battery state of the arriving train may be determined as the power shortage state. It is to be noted that the method for determining the battery state of the arriving train is not limited to this method, and other methods that can be used for determining the battery state of the train are also applicable to the present disclosure.

S102: Determining a target dwell time of the arriving train according to the battery state of the arriving train, actual operation data of the arriving train, and planned operation data of the arriving train, so that the arriving train stops for charging according to the target dwell time.

The actual operation data of the arriving train includes an actual arrival time of the arriving train, and the planned operation data of the arriving train includes a planned arrival time, a planned dwell time, a minimum dwell time, and a maximum dwell time of the arriving train. The minimum dwell time of the arriving train is an allowed minimum dwell time. The maximum dwell time of the arriving train is an allowed maximum dwell time. Usually, the planned dwell time is greater than or equal to the minimum dwell time, and is less than or equal to the maximum dwell time.

In the above technical solutions, during the determining of the target dwell time of the arriving train, the battery state of the arriving train itself is taken into full consideration. In this way, for the arriving train in the power shortage state and in the normal state, the target dwell time suitable for the train can be determined more specifically, thereby achieving the self-adaptive control of the charging duration of the arriving train.

Figure 2:
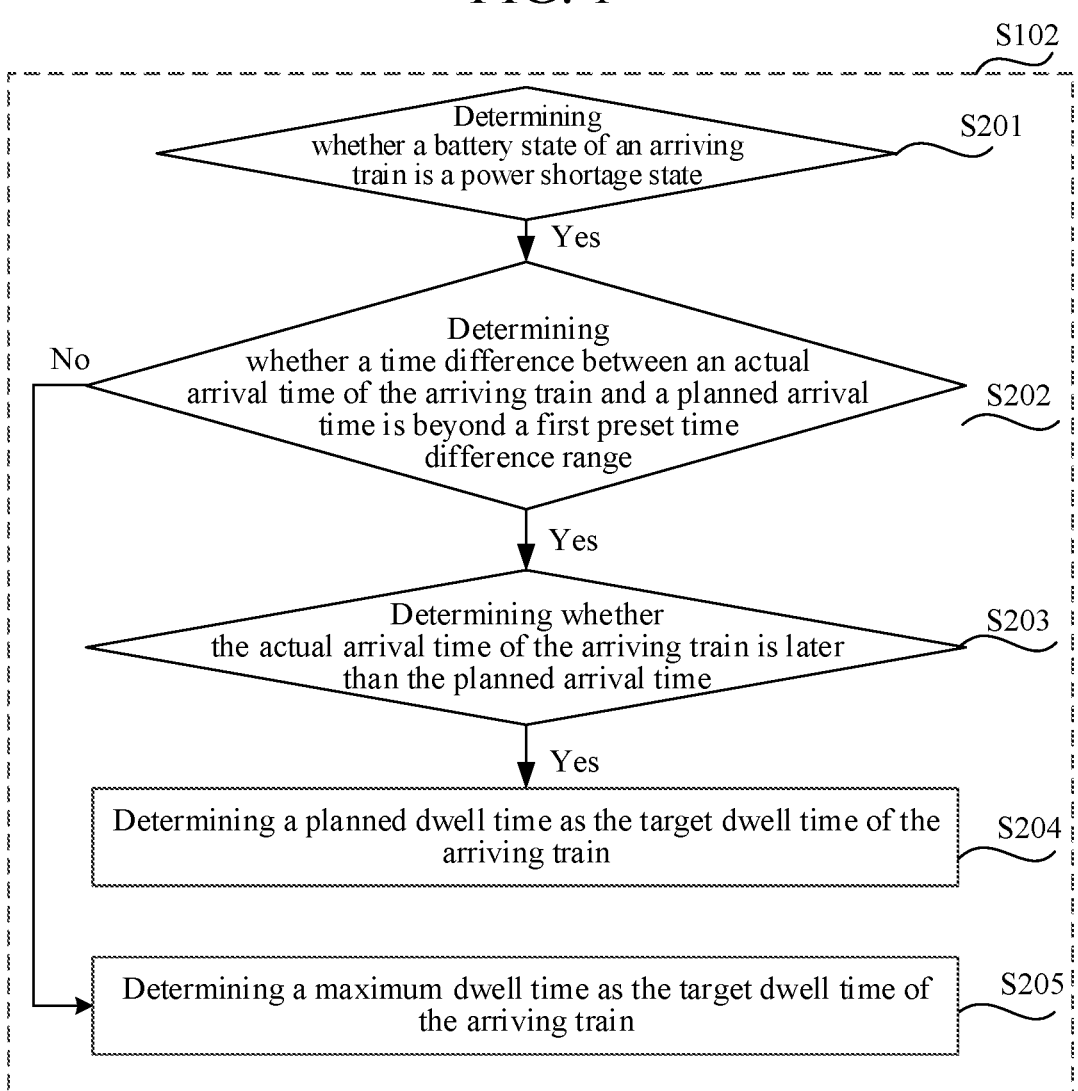
FIG. 2 is a flowchart of an exemplary implementation of determining a target dwell time of an arriving train in a train operation control method according to the present disclosure.

FIG. 2 is a flowchart of an exemplary implementation of determining a target dwell time of an arriving train in a train operation control method according to the present disclosure. In an implementation, as shown in FIG. 2, step 102 may further include the following steps.

S201: Determining whether the battery state of the arriving train is the power shortage state, and if so, performing step 202.

The battery state of the train includes the normal state and the power shortage state. A specific implementation of determining the battery state of the arriving train has been described above in detail. The details will not be described herein again.

S202: Determining whether a time difference between the actual arrival time of the arriving train and the planned arrival time is beyond a first preset time difference range, if so, performing step 203, and if not, performing step 205.

S203: Determining whether the actual arrival time of the arriving train is later than the planned arrival time, and if so, performing step 204.

The first preset time difference range may be set in the ATS system in advance. For example, the first preset time difference range is −5 s to +5 s, −10 s to +10 s, or the like. In this way, when the time difference between the actual arrival time of the arriving train and the planned arrival time is within the first preset time difference range, it is determined that the train arrives at the station on time. When the time difference between the actual arrival time of the arriving train and the planned arrival time is beyond the first preset time difference range, and the actual arrival time of the arriving train is later than the planned arrival time, it is determined that the train arrives at the station behind schedule. When the time difference between the actual arrival time of the arriving train and the planned arrival time is beyond a first preset time difference range, and the actual arrival time of the arriving train is earlier than the planned arrival time, it is determined that the train arrives at the station in advance.

S204: Determining the planned dwell time as the target dwell time of the arriving train.

S205: Determining the maximum dwell time as the target dwell time of the arriving train.

It should be noted that S201 and S202 may be performed in the following order. S201 is first performed, and then S202 is performed. Alternatively, S202 is first executed, and then S201 is performed, or the two steps are performed simultaneously. This is not limited in the present disclosure.

In the related art, when the arriving train arrives at the station behind schedule, the time difference between the actual arrival time and the planned arrival time is first determined. In a case that a difference between the planned dwell time and an absolute value of the time difference is less than the minimum dwell time, the minimum dwell time is determined as the target dwell time. In a case that the difference between the planned dwell time and the absolute value of the time difference is greater than or equal to the minimum dwell time, the difference between the planned dwell time and the absolute value of the time difference is determined as the target dwell time. When the arriving train arrives at the station on time, the planned dwell time is determined as the target dwell time. In the present disclosure, the battery state of the arriving train is taken into full consideration. When the arriving train is in the power shortage state and arrives at the station behind schedule, the arriving train still stops and travels according to the planned dwell time without adjusting the dwell time of the arriving train. When the arriving train is in the power shortage state and arrives at the station on time, the target dwell time of the arriving train is adjusted to the maximum dwell time. In this way, the target dwell time of the arriving train is extended, so as to increase the charging duration for the train in the power shortage state, so that the train can be replenished with more power at the station platform.

In another implementation, if the time difference between the actual arrival time and the planned arrival time is within the first preset time difference range (that is, the train arrives at the station on time), and the battery state of the arriving train is the power shortage state, it is determined that the target dwell time is a sum of the planned dwell time and the preset time. The sum of the planned dwell time and the preset time is less than the maximum dwell time, and the preset time may be set in the ATS system in advance. For example, if the first preset time difference range is −10 s to 10 s, the time difference between the actual arrival time of the train and the planned arrival time is 5 s, the maximum dwell time is 60 s, the planned dwell time is 40 s, and the preset time is 15 s, the target dwell time of the train is determined as 40 s+15 s=55 s. In this way, when the arriving train is in the power shortage state and arrives at the station on time, the train can stay at the station platform for a duration of the preset time. In this way, the target dwell time of the arriving train is extended, so that the train can be replenished with more power at the station platform.

Optionally, the method may include the following.

If the time difference between the actual arrival time of the arriving train and the planned arrival time is beyond the first preset time difference range, and the actual arrival time of the arriving train is earlier than the planned arrival time (that is, the train arrives at the station in advance), in a case that a sum of the absolute value of the time difference and the planned dwell time is greater than or equal to the maximum dwell time, the maximum dwell time is determined as the target dwell time, and in a case that the sum of the absolute value of the time difference and the planned dwell time is less than the maximum dwell time, the sum of the absolute value of the time difference and the planned dwell time is determined as the target dwell time.

For example, if the first preset time difference range is −10 s to +10 s, the time difference between the actual arrival time of the arriving train and the planned arrival time is 30 s, the train arrives at the station in advance, the planned dwell time is 40 s, and the maximum dwell time is 60 s, since (30 s+40 s)>60 s, the target dwell time is determined as 60 s.

For another example, if the first preset time difference range is −10 s to +10 s, the time difference between the actual arrival time of the arriving train and the planned arrival time is 30 s, the train arrives at the station in advance, the planned dwell time is 20 s, and the maximum dwell time is 60 s, since (30 s+20 s)<60 s, the target dwell time is determined as (30 s+20 s)=50 s. In this way, if the train arrives at the station in advance, an actual operation status of the train tends to be consistent with an operation plan by adjusting the target dwell time of the train. That is to say, the arriving train departs from the station on time according to a departure time in the operation plan.

If the time difference between the actual arrival time of the arriving train and the planned arrival time is beyond the first preset time difference range, the actual arrival time of the arriving train is later than the planned arrival time (that is, the train arrives at the station behind schedule), and the battery state is the normal state, in a case that the difference between the planned dwell time and the absolute value of the time difference is greater than or equal to the minimum dwell time, the difference between the planned dwell time and the absolute value of the time difference is determined as the target dwell time. In a case that the difference between the planned dwell time and the absolute value of the time difference is less than the minimum dwell time, the minimum dwell time is determined as the target dwell time.

For example, if the first preset time difference range is −10 s to +10 s, the time difference between the actual arrival time and the planned arrival time is 30 s, the train arrives at the station behind schedule, the battery state is the normal state, the planned dwell time is 60 s, and the minimum dwell time is 20 s, since (60 s−30 s)>20 s, the target dwell time is determined as 60 s−30 s=30 s. In this way, when the train arrives the station behind schedule, the train departs from the station on time according to the operation plan by adjusting the dwell time of the train.

For another example, if the first preset time difference range is −10 s to +10 s, the time difference between the actual arrival time and the planned arrival time is 30 s, the train arrives at the station behind schedule, the battery state is the normal state, the planned dwell time is 40 s, and the minimum dwell time is 20 s, since (40 s−30 s)<20 s, the minimum dwell time is determined as the target dwell time, that is, 20 s.

If the time difference between the actual arrival time of the arriving train and the planned arrival time is within the first preset time difference range (that is, the train arrives at the station on time), and the battery state is the normal state, the planned dwell time is determined as the target dwell time. In this way, if the arriving train is in the normal state, the target dwell time of the arriving train is adjusted according to the time difference between the actual arrival time of the arriving train and the planned arrival time, so that the actual operation status of the arriving train tends to be consistent with the operation plan.

According to the above technical solutions, when the arriving train is determined to be in the power shortage state, the target dwell time of the arriving train is properly extended. When the arriving train is determined to be in the normal state, the actual operation state of the arriving train tends to be consistent with the operation plan by adjusting the target dwell time of the arriving train. In this way, during the determining of the target dwell time of the arriving train, the battery state of the arriving train itself is taken into full consideration, so that the train can be replenished with more power at the station platform.

Figure 3:
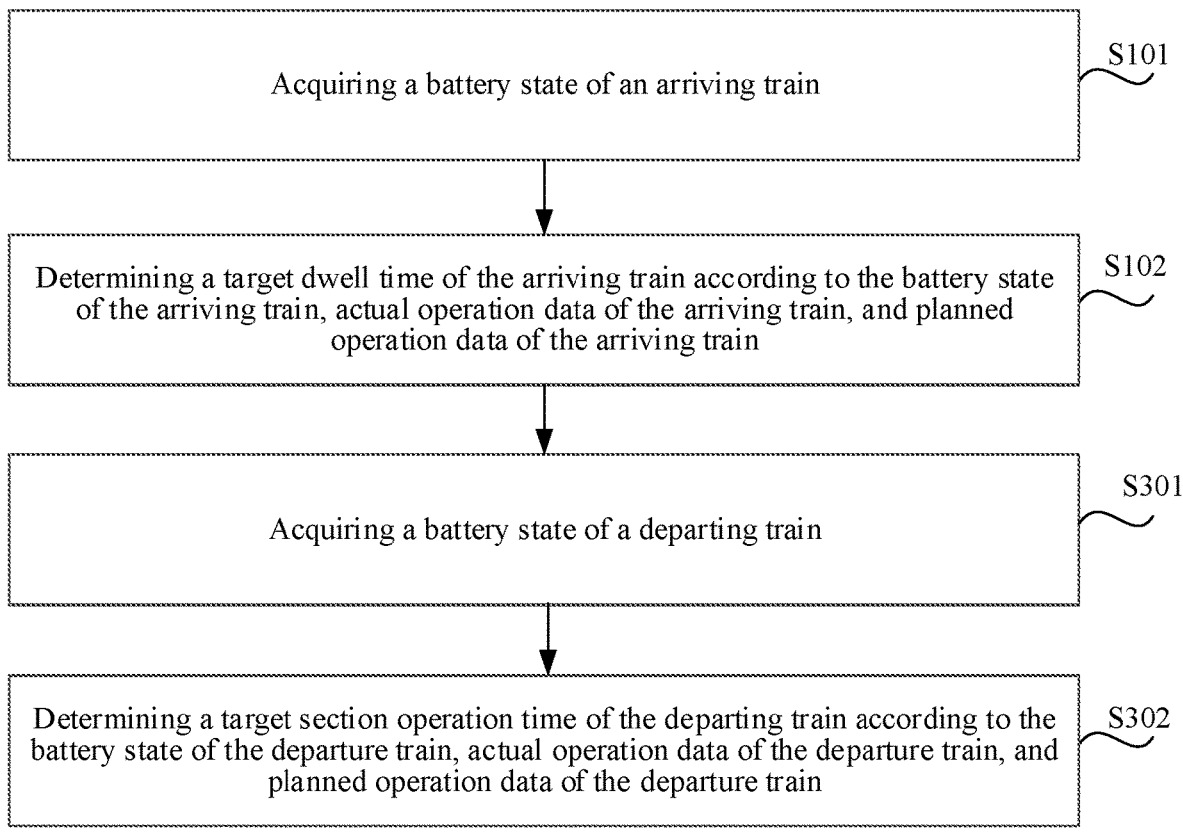
FIG. 3 is a flowchart of a train operation control method according to another exemplary embodiment of the present disclosure.

FIG. 3 is a flowchart of a train operation control method according to another exemplary embodiment of the present disclosure. As shown in FIG. 3, in addition to S101 to S102, the method may further include the following steps.

S301: Acquiring a battery state of a departing train.

The battery state of the departing train is a battery state of the train when departing from the station platform. In an implementation, a state of charge of a power battery of the departing train may be first acquired, and then the battery state of the departing train is determined according to the state of charge of the power battery of the departing train. The battery state of the departing train includes a normal state and a power shortage state. Specifically, a power threshold of the departing train may be set in the ATS system in advance. The power threshold of the departing train may be the same or different from the power threshold of the arriving train, which is not specifically limited herein. A specific implementation of determining the battery state of the departing train is similar to the specific implementation of determining the battery state of the arriving train. Details will not be described herein again. It is to be noted that, the method for determining the battery state of the departing train is not limited to this method, and other methods that can be used for determining the battery state of the train are also applicable to the present disclosure.

S302: Determining a target section operation time of the departing train according to the battery state of the departing train, actual operation data of the departing train, and planned operation data of the departing train, so that the departing train runs to a next station according to the target section operation time.

The actual operation data of the departing train includes an actual departure time of the departing train, and the planned operation data of the departing train includes a planned departure time, a planned section operation time, a minimum section operation time, and a maximum section operation time of the departing train.

According to the above technical solutions, during the determining of the target section operation time of the departing train, the battery state of the departing train itself is taken into full consideration. In this way, for the departing train in the power shortage state and in the normal state, the target section operation time suitable for the train can be determined more specifically, thereby achieving the self-adaptive adjustment of the section operation time of the departing train.

Figure 4:
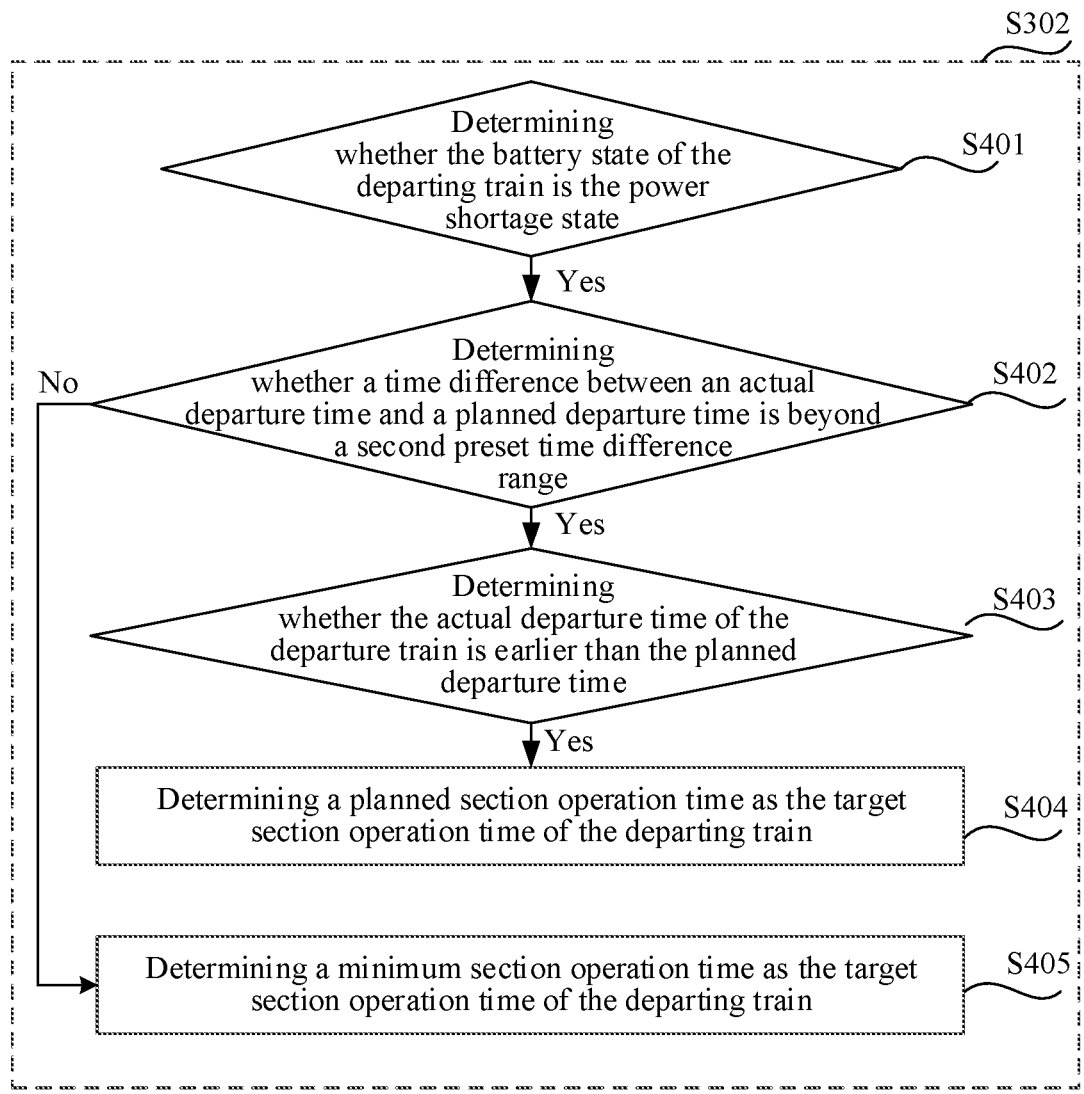
FIG. 4 is a flowchart of an exemplary implementation of determining a target section operation time of a departing train in a train operation control method according to the present disclosure.

FIG. 4 is a flowchart of an exemplary implementation of determining a target section operation time of a departing train in a train operation control method according to the present disclosure. As shown in FIG. 4, step 302 may include the following steps.

S401: Determining whether the battery state of the departing train is the power shortage state, and if so, performing step 402.

S402: Determining whether a time difference between the actual departure time of the departing train and the planned departure time is beyond a second preset time difference range, if so, performing step 403, and if not, performing step 405.

S403: Determining whether the actual departure time of the departing train is earlier than the planned departure time, and if so, performing step 404.

The second preset time difference range may be set in the ATS system in advance. The second preset time difference range may be the same or different from the first preset time difference range, which is not specifically limited herein. For example, the second preset time difference range is −10 s to +10 s. In this way, when the time difference between the actual departure time of the departing train and the planned departure time is within the second preset time difference range, the train is determined to depart from the station on time. When the time difference between the actual departure time of the departing train and the planned departure time is beyond the second preset time difference range, and the actual departure time of the departing train is earlier than the planned departure time, the train is determined to depart from the station in advance. When the time difference between the actual departure time of the departing train and the planned departure time is beyond the second preset time difference range, and the actual departure time of the departing train is later than the planned departure time, the train is determined to depart from the station behind schedule.

S404: Determining the planned section operation time as the target section operation time of the departing train.

S405: Determining the minimum section operation time as the target section operation time of the departing train.

It is to be noted that S401 and S402 may be performed in the following order. S401 is first performed, and then S402 is performed. Alternatively, S402 is first performed, and then S401 is performed, or the two steps are performed simultaneously. This is not limited in the present disclosure.

In the related art, when the departing train departs from the station in advance, the time difference between the actual departure time and the planned departure time is first determined, if a sum of an absolute value of the time difference and the planned section operation time is greater than or equal to the maximum section operation time, the maximum section operation time is determined as the target section operation time, and if the sum of the absolute value of the time difference and the planned section operation time is less than the maximum section operation time, the sum of the absolute value of the time difference and the planned section operation time is determined as the target section operation time. When the departing train departs from the station on time, the planned section operation time is determined as the target section operation time. In the present disclosure, the battery state of the departing train is taken into full consideration. When the departing train is in the power shortage state and departs from the station in advance, the departing train still travels according to the planned section operation time without adjusting the planned section operation time of the departing train. When the departing train is in the power shortage state and departs from the station on time, the target section operation time of the departing train is adjusted to the minimum section operation time, so that the section operation time of the departing train is shortened. Therefore, the train can arrive at the next station platform as soon as possible.

Optionally, the method may further include the following.

If the time difference between the actual departure time of the departing train and the planned departure time is beyond the second preset time difference range, the actual departure time of the departing train is earlier than the planned departure time (that is, the train departs from the station in advance), and the battery state of the departing train is the normal state, in a case that the sum of the absolute value of the time difference and the planned section operation time is greater than or equal to the maximum section operation time, the maximum section operation time is determined as the target section operation time, and in a case that the sum of the absolute value of the time difference and the planned section operation time is less than the maximum section operation time, the sum of the absolute value of the time difference and the planned section operation time is determined as the target section operation time.

For example, if the second preset time difference range is −10 s to +10 s, the time difference between the actual departure time and the planned departure time is 30 s, the train departs from the station in advance, the battery state is the normal state, the planned section operation time is 120 s, and the maximum section operation time is 140 s, since (30 s+120 s)>140 s, the maximum section operation time is determined as the target section operation time, that is 140 s.

For another example, if the second preset time difference range is −10 s to +10 s, the time difference between the actual departure time and the planned departure time is 30 s, the train departs from the station in advance, the battery state is the normal state, the planned section operation time is 100 s, and the maximum section operation time is 140 s, since (30 s+100 s)<140 s, the target section operation time is determined as 30 s+100 s=130 s. In this way, when the train is in the normal state and departs from the station in advance, the actual operation status of the train tends to be consistent with the operation plan by adjusting the target section operation time of the train. That is to say, the train arrives at the next station platform on time according to the operation plan.

If the time difference between the actual departure time of the departing train and the planned departure time is beyond the second preset time difference range, the actual departure time of the departing train is later than the planned departure time (that is, the train departs from the station behind schedule), and the battery state of the departing train is the normal state, in a case that the difference between the planned section operation time and the absolute value of the time difference is greater than or equal to the minimum section operation time, the difference between the planned section operation time and the absolute value of the time difference is determined as the target section operation time, and in a case that the difference between the planned section operation time and the absolute value of the time difference is less than the minimum section operation time, the minimum section operation time is determined as the target section operation time. In this way, when the departing train is in the normal state and departs from the station behind schedule, the actual operation status of the train tends to be consistent with the operation plan by adjusting the target section operation time of the train, that is, the train arrives at the next station platform on time according to the operation plan.

In an implementation, if the time difference between the actual departure time of the departing train and the planned departure time is beyond the second preset time difference range, the actual departure time of the departing train is later than the planned departure time (that is, the train departs from the station behind schedule), and the battery state of the departing train is the power shortage state, in a case that the difference between the planned section operation time and the absolute value of the time difference is less than the minimum section operation time, the minimum section operation time is determined as the target section operation time, and in a case that the difference between the planned section operation time and the absolute value of the time difference is greater than or equal to the minimum section operation time, the difference between the planned section operation time and the absolute value of the time difference is determined as the target section operation time.

In another implementation, the minimum section operation time is determined as the target section operation time. In this way, if the departing train is in the power shortage state and departs from the station behind schedule, the minimum section operation time is determined as the target section operation time, which shortens the section operation time of the departing train, so that the train can arrive at the next station platform as soon as possible.

If the time difference between the actual departure time of the departing train and the planned departure time is within the second preset time difference range (that is, the train departs from the station on time), and the battery state of the departing train is the normal state, the planned section operation time is determined as the target section operation time.

According to the above technical solutions, during the determining of the section operation time of the departing train, the battery state of the departing train is taken into full consideration. When the departing train is in the power shortage state, the target section operation time of the departing train is properly shortened. When the departing train is determined to be in the normal state, the actual operation state of the departing train tends to be consistent with the operation plan by adjusting the target section operation time of the departing train. In this way, during the determining of the target section operation time, the battery state of the departing train is taken into full consideration, so that the train in the power shortage state can arrive at the next station platform as soon as possible.

Figure 5:
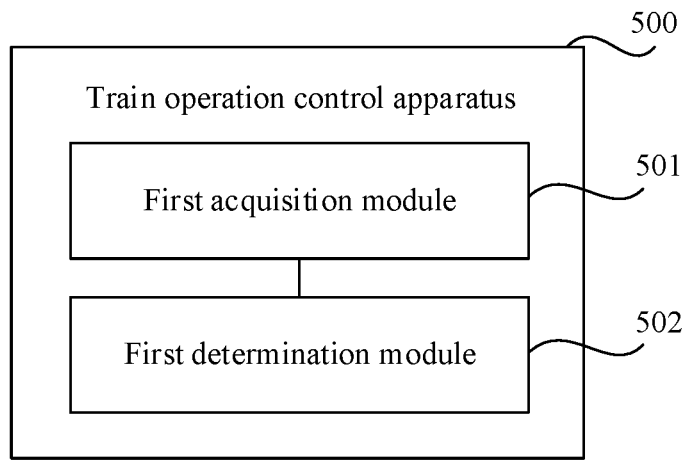
FIG. 5 is a block diagram of a train operation control apparatus according to an exemplary embodiment of the present disclosure.

FIG. 5 is a block diagram of a train operation control apparatus according to an exemplary embodiment of the present disclosure. As shown in FIG. 5, the apparatus 500 may include: a first acquisition module 501, configured to acquire a battery state of an arriving train; and a first determination module 502, configured to determine a target dwell time of the arriving train according to the battery state of the arriving train, actual operation data of the arriving train, and planned operation data of the arriving train, so that the arriving train stops for charging according to the target dwell time, where the actual operation data of the arriving train includes an actual arrival time of the arriving train, and the planned operation data of the arriving train includes a planned arrival time, a planned dwell time, a minimum dwell time, and a maximum dwell time of the arriving train.

According to the solutions of the present disclosure, during the determining of the target dwell time of the arriving train, the battery state of the arriving train itself is taken into full consideration. In this way, for the arriving train in the power shortage state and in the normal state, the target dwell time suitable for the train can be determined more specifically, thereby achieving the self-adaptive adjustment of the charging duration of the arriving train.

Optionally, the first acquisition module 501 is configured to: acquire a state of charge of a power battery of the arriving train; and determine the battery state of the arriving train according to the state of charge of the power battery of the arriving train, where the battery state of the arriving train includes a normal state and a power shortage state.

Optionally, the first determination module 502 is configured to: determine the planned dwell time as the target dwell time if a time difference between the actual arrival time and the planned arrival time is beyond a first preset time difference range, the actual arrival time of the arriving train is later than the planned arrival time, and the battery state of the arriving train is the power shortage state; and determine the maximum dwell time or a sum of the planned dwell time and a preset time as the target dwell time if the time difference between the actual arrival time and the planned arrival time is within the first preset time difference range, and the battery state of the arriving train is the power shortage state, where the sum of the planned dwell time and the preset time is less than the maximum dwell time.

Optionally, the first determination module 502 is configured to: determine, in a case that a sum of an absolute value of the time difference and the planned dwell time is greater than or equal to the maximum dwell time, the maximum dwell time as the target dwell time, and determine, in a case that the sum of the absolute value of the time difference and the planned dwell time is less than the maximum dwell time, the sum of the absolute value of the time difference and the planned dwell time as the target dwell time, if the time difference between the actual arrival time and the planned arrival time is beyond the first preset time difference range, and the actual arrival time of the arriving train is earlier than the planned arrival time; determine, in a case that a difference between the planned dwell time and the absolute value of the time difference is greater than or equal to the minimum dwell time, the difference between the planned dwell time and the absolute value of the time difference as the target dwell time, and determine, in a case that the difference between the planned dwell time and the absolute value of the time difference is less than the minimum dwell time, the minimum dwell time as the target dwell time, if the time difference between the actual arrival time and the planned arrival time is beyond the first preset time difference range, the actual arrival time of the arriving train is later than the planned arrival time, and the battery state of the arriving train is the normal state; and determine the planned dwell time as the target dwell time if the time difference between the actual arrival time and the planned arrival time is within the first preset time difference range, and the battery state of the arriving train is the normal state.

Figure 6:
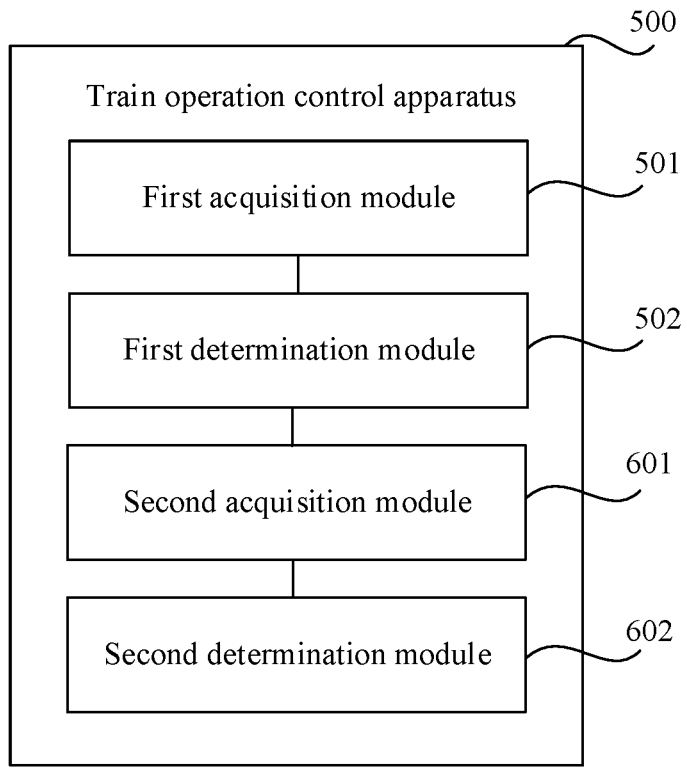
FIG. 6 is a block diagram of a train operation control apparatus according to another exemplary embodiment of the present disclosure.

FIG. 6 is a block diagram of a train operation control apparatus according to another exemplary embodiment of the present disclosure. As shown in FIG. 6, the apparatus 500 may further include: a second acquisition module 601, configured to acquire a battery state of a departing train; and a second determination module 602, configured to determine a target section operation time of the departing train according to the battery state of the departing train, actual operation data of the departing train, and planned operation data of the departing train, so that the departing train runs to a next station platform for charging according to the target section operation time, where the actual operation data of the departing train includes an actual departure time of the departing train, and the planned operation data of the departing train includes a planned departure time, a planned section operation time, a minimum section operation time, and a maximum section operation time of the departing train.

Optionally, the second acquisition module 601 is configured to: acquire a state of charge of a power battery of the departing train; and determine the battery state of the departing train according to the state of charge of the power battery of the departing train, where the battery state of the departing train includes a normal state and a power shortage state.

Optionally, the second determination module 602 is configured to: determine the planned section operation time as the target section operation time if a time difference between the actual departure time and the planned departure time is beyond a second preset time difference range, the actual departure time of the departing train is earlier than the planned departure time, and the battery state of the departing train is the power shortage state; and determine the minimum section operation time as the target section operation time if the time difference between the actual departure time and the planned departure time is within the second preset time difference range, and the battery state of the departing train is the power shortage state.

Optionally, the second determination module 602 is configured to: determine, in a case that a sum of an absolute value of the time difference and the planned section operation time is greater than or equal to the maximum section operation time, the maximum section operation time as the target section operation time, and determine, in a case that a sum of the absolute value of the time difference and the planned section operation time is less than the maximum section operation time, the sum of the absolute value of the time difference and the planned section operation time as the target section operation time, if the time difference between the actual departure time and the planned departure time is beyond the second preset time difference range, the actual departure time of the departing train is earlier than the planned departure time, and the battery state of the departing train is the normal state; determine, in a case that a difference between the planned section operation time and the absolute value of the time difference is greater than or equal to the minimum section operation time, the difference between the planned section operation time and the absolute value of the time difference as the target section operation time, and determine, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the normal state; determine, in a case that the difference between the planned section operation time and the absolute value of the time difference is greater than or equal to the minimum section operation time, the difference between the planned section operation time and the absolute value of the time difference or the minimum section operation time as the target section operation time, and determine, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the power shortage state; and determine the planned section operation time as the target section operation time if the time difference between the actual departure time and the planned departure time is within the second preset time difference range, and the battery state of the departing train is the normal state.

Regarding the apparatus in the above embodiments, a specific manner in which each module performs the operation has been described in detail in the embodiments related to the method, and the details will not be described herein.

Figure 7:
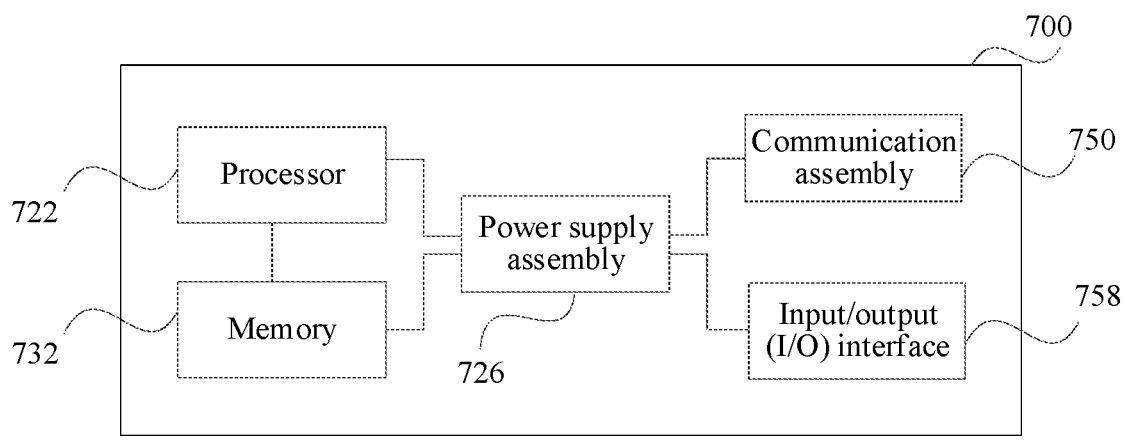
FIG. 7 is a block diagram of a train operation control apparatus according to an exemplary embodiment of the present disclosure.

FIG. 7 is a block diagram of an electronic device 700 according to an exemplary embodiment. The electronic device may be implemented as a train operation control apparatus. For example, the electronic device 700 may be provided as a server. Referring to FIG. 7, the electronic device 700 includes one or more processors 722 and a memory 732 configured to store a computer program executable by the processor 722. The computer program stored in the memory 732 may include one or more modules each corresponding to a set of instructions. In addition, the processor 722 may be configured to execute the computer program to perform the above train operation control method.

In addition, the electronic device 700 may further include a power supply assembly 726 and a communication assembly 750. The power supply assembly 726 may be configured to perform power management of the electronic device 700, and the communication assembly 750 may be configured to implement communication of the electronic device 700, for example, wired or wireless communication. Furthermore, the electronic device 700 may further include an input/output (I/O) interface 758. The electronic device 700 may operate an operating system stored in the memory 732, for example, Windows Server™, Mac OS X™, Unix™, Linux™, or the like.

In another exemplary embodiment, a non-transitory computer-readable storage medium including a program instruction is further provided. When the program instruction is executed by a processor, steps of the above train operation control method are performed. For example, the computer-readable storage medium may be the above memory 732 including a program instruction. The above program instruction may be executed by the processor 722 of the electronic device 700 to complete the above train operation control method.

In another exemplary embodiment, a computer program product is further provided. The computer program product includes a computer program that can be executed by a programmable apparatus. The computer program has a code part, when executed by the programmable apparatus, for performing the above train operation control method.

The implementations of the present disclosure are described in detail above with reference to the accompanying drawings. However, the present disclosure is not limited to the specific details in the foregoing implementations, a plurality of simple deformations may be made to the technical solution of the present disclosure within a range of the technical concept of the present disclosure, and these simple deformations fall within the protection scope of the present disclosure.

It should be further noted that the specific technical features described in the above specific implementations may be combined in any suitable manner without contradiction. To avoid unnecessary repetition, various possible combinations are not further described in the present disclosure.

In addition, different implementations of the present disclosure may also be arbitrarily combined without departing from the idea of the present disclosure, and these combinations shall still be regarded as content disclosed in the present disclosure.

What is claimed is:

1. A train operation control method for an automatic train supervision system, comprising:
   acquiring a state of charge of a power battery of an arriving train from a power battery detection module mounted to the arriving train through a communication network, wherein the power battery provides power for driving the arriving train;
   determining a battery state of the arriving train according to the state of charge of the power battery of the arriving train, wherein the battery state of the arriving train comprises a normal state and a power shortage state;
   determining a target dwell time of the arriving train according to the battery state of the arriving train, actual operation data of the arriving train, and planned operation data of the arriving train, wherein the actual operation data of the arriving train comprises an actual arrival time of the arriving train, and the planned operation data of the arriving train comprises a planned arrival time, a planned dwell time, a minimum dwell time, and a maximum dwell time of the arriving train; and using the target dwell time as charging time for the arriving train to stop for charging the power battery such that the power battery is charged whether the battery state of the arriving train is the normal state or the power shortage state.

2. The method according to claim 1, wherein the determining a target dwell time of the arriving train according to the battery state of the arriving train, actual operation data of the arriving train, and planned operation data of the arriving train comprises:

determining the planned dwell time as the target dwell time if a time difference between the actual arrival time and the planned arrival time is beyond a first preset time difference range, the actual arrival time of the arriving train is later than the planned arrival time, and the battery state of the arriving train is the power shortage state; and determining the maximum dwell time or a sum of the planned dwell time and a preset time as the target dwell time if the time difference between the actual arrival time and the planned arrival time is within the first preset time difference range, and the battery state of the arriving train is the power shortage state, wherein the sum of the planned dwell time and the preset time is less than the maximum dwell time.

3. The method according to claim 1, wherein the determining a target dwell time of the arriving train according to the battery state of the arriving train, actual operation data of the arriving train, and planned operation data of the arriving train comprises:

determining, in a case that a sum of an absolute value of the time difference and the planned dwell time is greater than or equal to the maximum dwell time, the maximum dwell time as the target dwell time, and determining, in a case that the sum of the absolute value of the time difference and the planned dwell time is less than the maximum dwell time, the sum of the absolute value of the time difference and the planned dwell time as the target dwell time, if the time difference between the actual arrival time and the planned arrival time is beyond the first preset time difference range, and the actual arrival time of the arriving train is earlier than the planned arrival time;

determining, in a case that a difference between the planned dwell time and the absolute value of the time difference is greater than or equal to the minimum dwell time, the difference between the planned dwell time and the absolute value of the time difference as the target dwell time, and determining, in a case that the difference between the planned dwell time and the absolute value of the time difference is less than the minimum dwell time, the minimum dwell time as the target dwell time, if the time difference between the actual arrival time and the planned arrival time is beyond the first preset time difference range, the actual arrival time of the arriving train is later than the planned arrival time, and the battery state of the arriving train is the normal state; and determining the planned dwell time as the target dwell time if the time difference between the actual arrival time and the planned arrival time is within the first preset time difference range, and the battery state of the arriving train is the normal state.

4. The method according to claim 1, further comprising:
acquiring a battery state of a departing train; and
determining a target section operation time of the departing train according to the battery state of the departing train, actual operation data of the departing train, and planned operation data of the departing train, so that the departing train runs to a next station according to the target section operation time, wherein the actual operation data of the departing train comprises an actual departure time of the departing train, and the planned operation data of the departing train comprises a planned departure time, a planned section operation time, a minimum section operation time, and a maximum section operation time of the departing train.

5. The method according to claim 4, wherein the determining a target section operation time of the departing train according to the battery state of the departing train, actual operation data of the departing train, and planned operation data of the departing train comprises:

determining the planned section operation time as the target section operation time if a time difference between the actual departure time and the planned departure time is beyond a second preset time difference range, the actual departure time of the departing train is earlier than the planned departure time, and the battery state of the departing train is the power shortage state; and determining the minimum section operation time as the target section operation time if the time difference between the actual departure time and the planned departure time is within the second preset time difference range, and the battery state of the departing train is the power shortage state.

6. The method according to claim 4, wherein the determining a target section operation time of the departing train according to the battery state of the departing train, actual operation data of the departing train, and planned operation data of the departing train comprises:

determining, in a case that a sum of an absolute value of the time difference and the planned section operation time is greater than or equal to the maximum section operation time, the maximum section operation time as the target section operation time, and determining, in a case that a sum of the absolute value of the time difference and the planned section operation time is less than the maximum section operation time, the sum of the absolute value of the time difference and the planned section operation time as the target section operation time, if the time difference between the actual departure time and the planned departure time is beyond the second preset time difference range, the actual departure time of the departing train is earlier than the planned departure time, and the battery state of the departing train is the normal state;

determining, in a case that a difference between the planned section operation time and the absolute value of the time difference is greater than or equal to the minimum section operation time, the difference between the planned section operation time and the absolute value of the time difference as the target section operation time, and determining, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the normal state;

determining, in a case that the difference between the planned section operation time and the absolute value of the time difference is greater than or equal to the minimum section operation time, the difference between the planned section operation time and the absolute value of the time difference or the minimum section operation time as the target section operation time, and determining, in a case that the difference between the planned section operation time and the absolute value of the time difference is less than the minimum section operation time, the minimum section operation time as the target section operation time, if the time difference between the actual departure time and the planned departure time is beyond the second preset time difference range, the actual departure time of the departing train is later than the planned departure time, and the battery state of the departing train is the power shortage state; and determining the planned section operation time as the target section operation time if the time difference between the actual departure time and the planned departure time is within the second preset time difference range, and the battery state of the departing train is the normal state.

7. The method according to claim 1, wherein the acquiring a battery state of a departing train comprises:

acquiring a state of charge of a power battery of the departing train; and determining the battery state of the departing train according to the state of charge of the power battery of the departing train, wherein the battery state of the departing train comprises a normal state and a power shortage state.

8. A train operation control apparatus, comprising:

a first acquisition module, configured to acquire a state of charge of a power battery of an arriving train from a power battery detection module mounted to the arriving train through a communication network, wherein the power battery provides power for driving the arriving train; and determine a battery state of the arriving train according to the state of charge of the power battery of the arriving train, wherein the battery state of the arriving train comprises a normal state and a power shortage state; and a first determination module, configured to determine a target dwell time of the arriving train according to the battery state of the arriving train, actual operation data of the arriving train, and planned operation data of the arriving train, wherein the actual operation data of the arriving train comprises an actual arrival time of the arriving train, and the planned operation data of the arriving train comprises a planned arrival time, a planned dwell time, a minimum dwell time, and a maximum dwell time of the arriving train; and use the target dwell time as charging time for the arriving train to stop for charging the power battery such that the power battery is charged whether the battery state of the arriving train is the normal state or the power shortage state.

9. The apparatus according to claim 8, wherein the first determination module is configured to:

determine the planned dwell time as the target dwell time if a time difference between the actual arrival time and the planned arrival time is beyond a first preset time difference range, the actual arrival time of the arriving train is later than the planned arrival time, and the battery state of the arriving train is the power shortage state; and determine the maximum dwell time or a sum of the planned dwell time and a preset time as the target dwell time if the time difference between the actual arrival time and the planned arrival time is within the first preset time difference range, and the battery state of the arriving train is the power shortage state, wherein the sum of the planned dwell time and the preset time is less than the maximum dwell time.

10. The apparatus according to claim 8, further comprising:

a second acquisition module, configured to acquire a battery state of a departing train; and a second determination module, configured to determine a target section operation time of the departing train according to the battery state of the departing train, actual operation data of the departing train, and planned operation data of the departing train, so that the departing train runs to a next station platform for charging according to the target section operation time, wherein the actual operation data of the departing train comprises an actual departure time of the departing train, and the planned operation data of the departing train comprises a planned departure time, a planned section operation time, a minimum section operation time, and a maximum section operation time of the departing train.

11. The apparatus according to claim 10, wherein the second determination module is configured to:

determine the planned section operation time as the target section operation time if a time difference between the actual departure time and the planned departure time is beyond a second preset time difference range, the actual departure time of the departing train is earlier than the planned departure time, and the battery state of the departing train is the power shortage state; and determine the minimum section operation time as the target section operation time if the time difference between the actual departure time and the planned departure time is within the second preset time difference range, and the battery state of the departing train is the power shortage state.

12. A train operation control apparatus, comprising:

a memory, storing a computer program therein; and a processor, configured to execute the computer program to:

acquire a state of charge of a power battery of an arriving train from a power battery detection module mounted to the arriving train through a communication network, wherein the power battery provides power for driving the arriving train; and determine a battery state of the arriving train according to the state of charge of the power battery of the arriving train, wherein the battery state of the arriving train comprises a normal state and a power shortage state; and determine a target dwell time of the arriving train according to the battery state of the arriving train, actual operation data of the arriving train, and planned operation data of the arriving train, wherein the actual operation data of the arriving train comprises an actual arrival time of the arriving train, and the planned operation data of the arriving train comprises a planned arrival time, a planned dwell time, a minimum dwell time, and a maximum dwell time of the arriving train; and use the target dwell time as charging time for the arriving train to stop for charging the power battery such that the power battery is charged whether the battery state of the arriving train is the normal state or the power shortage state.

* * * * *